Aug. 23, 1949.  C. C. DOYLE  2,479,913
CONTROL APPLIANCE FOR ELECTRIC HEATERS
Filed March 23, 1945  2 Sheets-Sheet 1
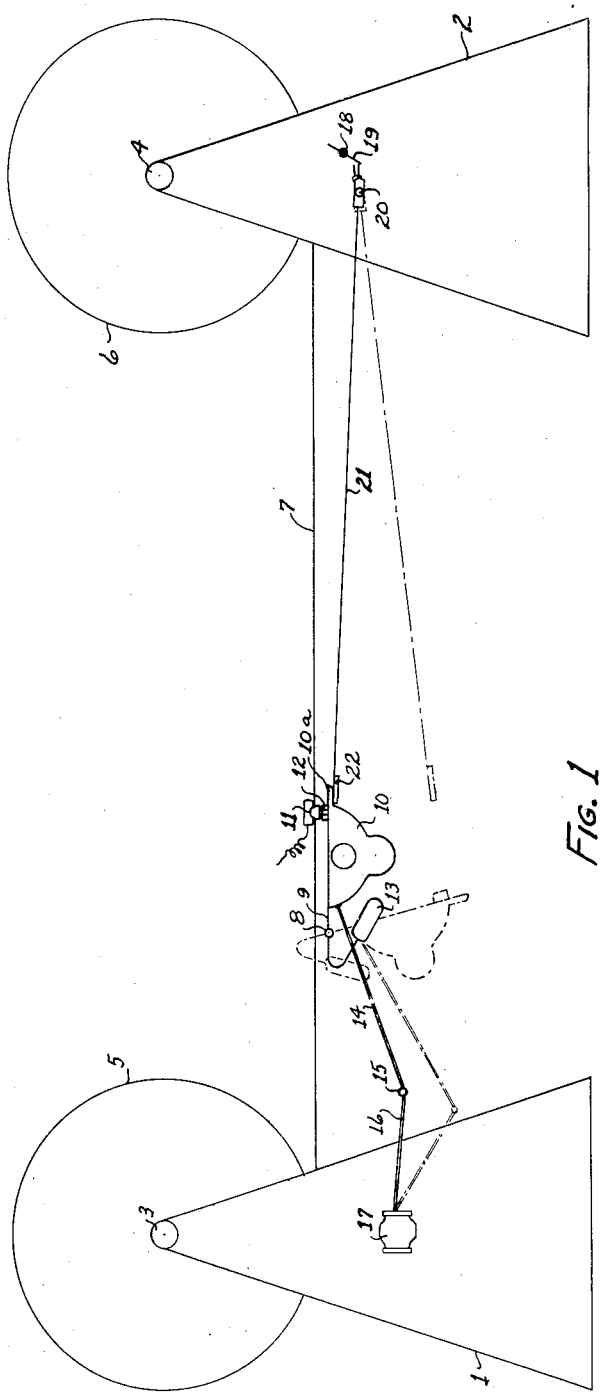
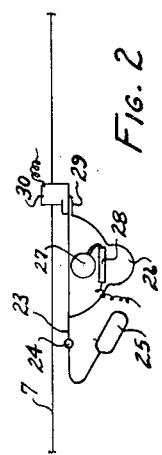
INVENTOR.
CHARLES C. DOYLE
BY Aug. 23, 1949.　　　　　C. C. DOYLE　　　　2,479,913
CONTROL APPLIANCE FOR ELECTRIC HEATERS
Filed March 23, 1945　　　　　　　　　　　　2 Sheets-Sheet 2

INVENTOR.
CHARLES C. DOYLE
BY

Patented Aug. 23, 1949

2,479,913

UNITED STATES PATENT OFFICE 2,479,913

CONTROL APPLIANCE FOR ELECTRIC HEATERS

Charles C. Doyle, Willoughby, Ohio

Application March 23, 1945, Serial No. 584,308

10 Claims. (Cl. 219—34)

My present invention pertains to a control appliance for electric heaters to be carried at the path of travel of material to be heat-processed in transit on a machine. More particularly, the appliance comprises cooperative devices for automatically retracting the heater from the path of travel of the material and for deenergizing the heater whenever the machine or its conveyor ceases to operate, and for automatically delaying heater energization.

Paper, textiles and other material to be unwound from one roll, subjected to heat (advantageously emanating from an infrared-glowing element) and then rewound as a roll of a variously modified product, are likely to become injuriously overheated or spoiled if continuous conveyance through the heated zone should happen to cease, whatever the cause. Consequently, it is desirable to provide an appliance adapted automatically to function to prevent damage or destruction of the material and incidentally to conserve electric current when not beneficially consumed. The foregoing declares the general object of my origination. Specific objects have been simplicity and durability of structure whether comprising mechanical or electrical interconnections between the machine and my appliance, besides reliability of cooperative performance.

While the drawings exemplify the application of my improvements to a web printing press, it is to be understood that the scope of my inventions comprehends many equivalent constructions properly allowing variation in the type of conveying machine, type of heater, type of holding means, type of releasing means and type of heater-shifting means and automatic heater deenergization within the scope of the granted claims.

Adverting to the drawings:

Figure 1 is a diagrammatic elevation of a conveyor comprising winding and unwinding rolls and embodying my inventions with certain parts shown by dot and dash lines in alternative positions.

Figure 2 is an elevation of a modification of structure and location of equivalent devices of those appearing directly above in Figure 1.

Figure 3:
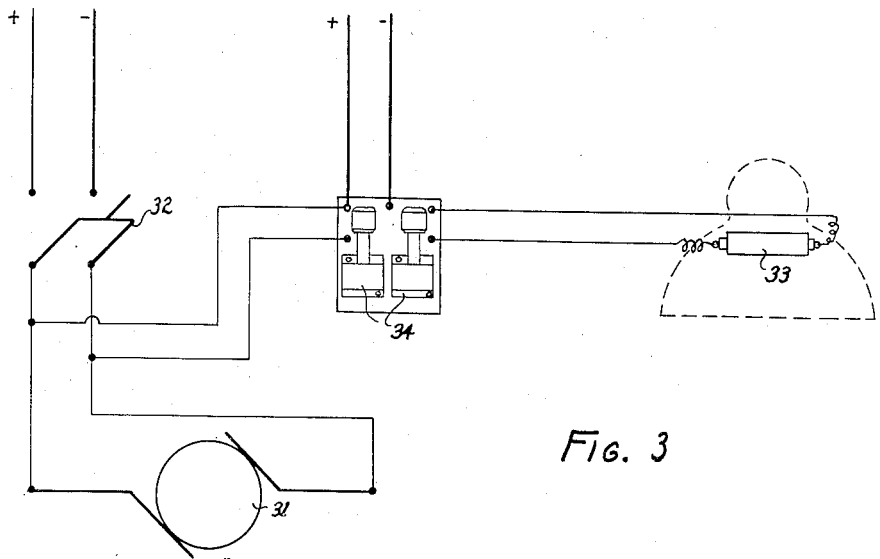
Figure 3 is a wiring diagram including one marketed type of delayed-action switch whereby the heater becomes energized an interval of time after the machine on which it is mounted has commenced operation.

The illustration of the winding and unwinding rolls in Figure 1 were selected to simplify the draftman's work as compared with the many auxiliary details of a printing-press conveying mechanism, even if merely outlined. Essential to the showing here, is that a heater of the type shown, described and claimed in my pending application, filed February 15, 1945, Serial No. 578,102, be appositioned to direct its open glow, infrared heat either from above or from below the path of travel (exemplifiedly of sheet material, textile, paper, plastic, veneer or even metal) of whatever is to be heated or dried during transit on or through a machine. Moreover, an appliance or appliances for accomplishing an automatic control; (a) of deenergization of the heater when the conveying past it ceases, with likelihood of injury to the stationary material in proximity to the source of heat, (b) as an added safeguard because of stored heat for an interval of time even after deenergization, of bodily shift of the heater in either of two directions away from the path of travel and (c) of a delayed-action energization of the heater for a suitable interval of time after the operation of the conveyor has commenced or recommenced, whereby, when an electric prime mover is employed, the loads imposed by operation of the conveying mechanism and by the electrical resistance unit or units will involve a time differential or be successive instead of simultaneous; incidentally to delay heat transfer until the material has attained a normal speed of travel. As exemplified by the diagram of Figure 3, the energization of the heater will follow by about thirty to forty seconds the operation of the conveying mechanism by the inclusion in the heater circuit of an automatically functionating delayed action switch or relay of a hitherto marketed type.

Spaced pedestals 1 and 2 respectively constitute a support to carry shafts 3 and 4 on which indeterminately long lengths of, say, printing paper are to be rolled and unrolled. The rolled paper on the shaft 3 has been designated with the numeral 5, that on the shaft 4 with the numeral 6 whereas the intermediate, straight-line and connecting section has been marked with the numeral 7. Pivotally mounted on a fixture or part of the press at 8 and intermediately of its ends is a bracket 9 to which is attached, in any appropriate manner, the open side of an electrical heater 10 of my approved design. Another fixture carries a conventional socket terminal 11 for the reception, when the heater, as here, is swung up to assume its functionating position adjacent to the lower side of the section 7, of a dual-prong plug 12 attached to the upper side of the free end of the bracket 9 from which it is to be duly insulated. A counterweight 13 has a bowed connection with the bracket 9 on the opposite side of the pivot 8 and serves the usual purpose of insuring a smoother, downwardly swinging displacement of the heater, but subject to a dampening device comprising a rod 14 having one end turnably connected with the heater casing, its other end articulated at 15 with the one end of another rod 16 having its other end operatively connected with a frictional check or movement restraining contrivance 17, which it is not necessary further to illustrate because old in many arts and not by itself herein claimed. While the counterweight 13 may, as is next to be described, initiate the downward swing of the heater, it is preferable to have such a displacement movement prevented from pendulum-swinging and from an impact stop.

The other pedestal 2 has a pivot 18 for a lever 19 to be supposed as having its free end itself provided with a handle to constitute the manual operating lever for accomplishing the press actuation or to be connected through a train of mechanism to a remote starting and stopping control for the press. Whatever the mechanical connection with the upper (as shown, "free") end of the lever 18, the only significance to my invention is that its other or lower end is adapted to rock about a pivot point 20 an elongated extension 21 terminating as a flat finger 22 adapted to underlie a suitable projection 10a on the bracket 8. When in that position it serves to maintain the plug 12 within the socket 11 against the tendency of the counterweight 13 to effect a withdrawal of the former from the latter. An actuation of the press-control-lever to stop the press will swing the extension 21 downwardly to its dot-and-dash-line position, shown in Figure 1, whereby presently to permit the projection 10a to swing clear of the extremity of the finger 22 in response to the action of the counterweight 13 until the heater and counterweight ultimately assume their dot-and-dash-line positions as likewise appears in Figure 1. It will now be evident that a stoppage of the press will simultaneously break the electrical connection at 11—12 for supplying current to the resistance coils of the heater 10 and cause the bodily swing of the heater so that its residual heat is removed to a zone more remote from the path of travel of the paper between the rolls 5 and 6. Though a reestablishment of the positions of the displaceable parts in which they appear in full lines in Figure 1 is of minor consequence, it is mentioned that the heater may be satisfactorily returned manually to its functionating position preparatory to being again maintained in its full-line position after starting or restarting of the press.

The modification to which Figure 2 pertains consists of an all-electrical control of the deenergization of the heater whenever the press-driving electric motor is for any reason deenergized and involves a common type of mercury-displacement switch. A bracket 23 is similarly pivoted at 24, counterweighted at 25 and carries the heater 26 which comprises a resistance coil 27 and therebelow, as part of one of its leads, a common type of mercury switch 28 adapted when the level of the mercury is about horizontal to maintain the circuit closed, but to disrupt the circuit when the mercury level withdraws from a contactual terminal consequent to a bodily (swinging) shift of the mercury container. In this form the projection 29 on the bracket 23 is adapted to be attracted and held as appears in Figure 2 by an electro magnet 30 which is in turn adapted to become deenergized simultaneously with cessation of press and conveyor operation by reason of being in the same circuit with the prime-moving motor. Manifestly, release of the 29—30 attraction permits the counterweight to exercise its function by causing the bodily swing of the entire heater construction including the mercury switch 28. Though some form of dampening device is desirable, it has been deemed superfluous again to repeat in Figure 2 its illustration as adequately shown in Figure 1.

The diagrammatic wiring hook-up of Figure 3 is to be considered as incorporated in any all-electrical control which is probably to be more often employed. Deemed requisite for identification is an electric motor 31, a switch 32 for simultaneously closing both the press-operation and/or conveyor circuit and the circuit of which my design of heater 33 is a part. However, also connected in the heater-circuit is a time relay designated in its entirety by the numeral 34. The relay has a delayed action in closing the circuit which action is adjustable within limits. A range of between thirty and forty seconds' delay has been found quite satisfactory for my purpose, which, as earlier stated, is to make the "drag" of press operation and heater energization a successive one. One form which might be adopted comprises a mercury supply within the confines of a solenoid which when energized so attracts a "displacer" as to immerse more of the latter in the mercury and to effect a rise of its level, during the predetermined short interval of time, until it touches the end of an electrode.

Figure 4:
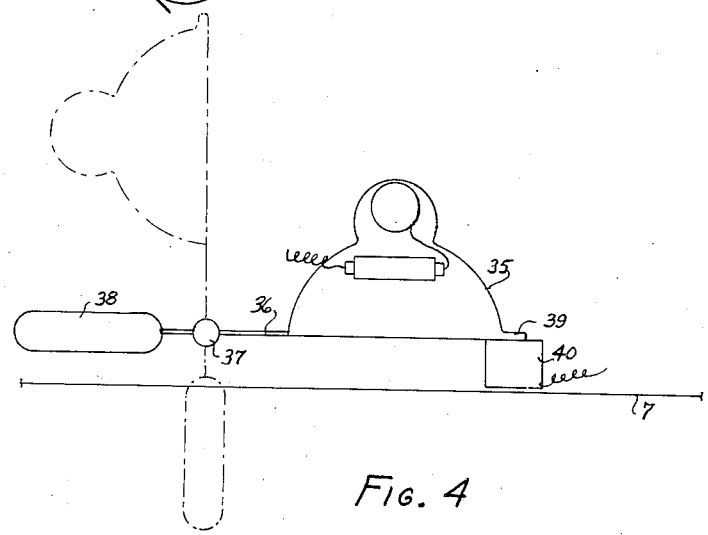
Figure 4 is a slightly enlarged elevation of the heater connections adapting it to swing upwardly to the dot and dash line position shown instead of downwardly as portrayed in Figure 1.

Figure 4 is substantially a mere inversion of Figure 2, in that the swingable heater displacement is upwardly instead of downwardly. That reversal of heater movement is sometimes desirable or even required, depending upon the type of machine and/or conveyor and/or upon the free space available for the expectable range of heater movement. Here, the heater 35 is just above the path of travel 7, its supporting bracket 36 is pivoted at 37, with a counterweight 38, projection 39 and magnetic means 40 for attracting and maintaining the projection and hence the entire heater unit in the full-line position, or, upon deenergization of the magnet 40, permitting the counterweight to swing the structure upwardly instead of downwardly. Again, there is omitted a repetition of the restraining contrivance 14—17 shown in Figure 1, albeit it or some equivalent is desirable and to be combined commercially.

Figure 5:
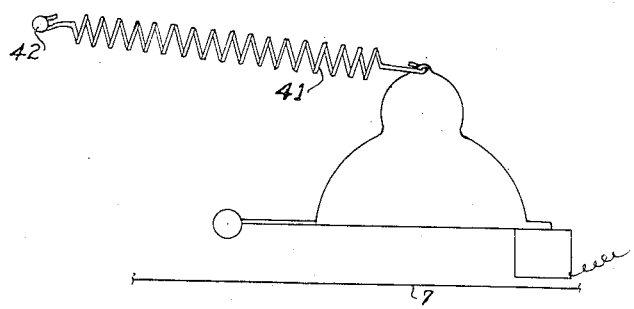
Figure 5 is a view corresponding to Figure 4 except for the inclusion of an actuating spring in place of the counterweight employed in Figures 1 and 4.

Figure 5 is a modification precisely like what is shown in Figure 4 except that an obvious equivalent of the counterweight in function is substituted, namely, a tension spring 41 appropriately and/or feasibly connecting any convenient part of the heater or its supporting bracket with a fixed point 42. Here again, a device for checking at least the concluding range of movement of the heater should be considered to be incorporated, to prevent impact noise or injury to the rather delicate coil-suspension connectors which I employ.

Moreover, both Figures 4 and 5 should be presumed to comprehend my intention to have the units of the wiring diagram of Figure 3 embodied therein, except that in some cases there may be substituted (satisfactorily in the heater's circuit) for the automatically delayed action of the relay 34, any other type of switch or a switch subject to independent manual operation.

I claim:

1. A control for heat-conditioning traveling material, comprising the combination of a support, an appliance carried by said support for moving material, an electric motor for operating said appliance, an electric heating appliance mounted on said support in apposition to the path of movement of the material, one of said appliances being displaceably connected with said support and being biased to move to increase the space between the material and said heating appliance, and electro-magnetic means for maintaining said displaceable appliance in an effective position of proximity to the other appliance, said motor, heating appliance and electro-magnetic means being in the same electrical circuit whereby to synchronize the operation of said material-moving appliance and the energization of both heating appliance and electro-magnetic means whereby damage to material is prevented upon a sub-normal rate of movement of the material.

2. The combination as in claim 1, wherein the means for controlling the heater displacement is a counter-force-exerting pair of devices for effecting and checking respectively.

3. The combination as in claim 1, wherein the means for controlling displacement of the heater away from the path of material is operable independently of the electric circuit.

4. The combination as in claim 1, wherein the heater comprises a contact movable therewith and cooperative with a relatively fixed contact to deenergize said heater upon its movement away from the path of conveyed material.

5. The combination as in claim 1, wherein an actuator connected with said heater and independent of electrical influence serves to effect the bodily displacement of the heater.

6. The combination as in claim 1, wherein the means for maintaining the heater in effective position is automatically operative to control the energization of the heater until the material has attained a predetermined speed.

7. The combination as in claim 1, wherein there are successively operative heater-energization and heater-positioning means both connected with the machine and respectively adapted automatically first to deenergize and then to displace the heater.

8. The combination as in claim 1, wherein the heater is adapted to rest in one of two alternative positions and the displacement control to the inutile one of said positions includes separate mechanisms which are successively operative, first to initiate the displacement movement and next to check such movement.

9. The combination as in claim 1, wherein the heater has an open-glow resistance element and the heater displacement movement describes an arcuate path.

10. The combination as in claim 1, wherein the means for effecting relative separation between the appliances comprises a connection with the heating appliance.

CHARLES C. DOYLE.

REFERENCES CITED

The following references are of record in the file of this patent:

UNITED STATES PATENTS

| Number | Name | Date |
|---|---|---|
| 1,479,819 | Kluever | Jan. 8, 1924 |
| 2,108,143 | Saunders | Feb. 15, 1938 |
| 2,127,956 | Helmer | Aug. 23, 1938 |
| 2,177,299 | Fredrickson | Oct. 24, 1939 |
| 2,180,711 | Lehmann | Nov. 21, 1939 |
| 2,325,950 | Greene et al. | Aug. 3, 1943 |

FOREIGN PATENTS

| Number | Country | Date |
|---|---|---|
| 548,311 | Great Britain | Oct. 6, 1942 |